US011870589B2

(12) United States Patent
Taherzadeh Boroujeni et al.

(10) Patent No.: US 11,870,589 B2
(45) Date of Patent: Jan. 9, 2024

(54) METHOD AND APPARATUS WITH MULTI-CONFIGURATION HARQ MESSAGE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/302,128

(22) Filed: Apr. 23, 2021

(65) Prior Publication Data

US 2021/0385024 A1   Dec. 9, 2021

Related U.S. Application Data

(60) Provisional application No. 63/036,937, filed on Jun. 9, 2020.

(51) Int. Cl.
*H04W 72/23* (2023.01)
*H04L 1/1812* (2023.01)
(Continued)

(52) U.S. Cl.
CPC .......... *H04L 1/1819* (2013.01); *H04L 1/1896* (2013.01); *H04W 72/23* (2023.01); *H04W 80/02* (2013.01)

(58) Field of Classification Search
CPC .......... H04W 72/1289; H04W 72/042; H04W 72/0446; H04W 80/02; H04L 1/1819;
(Continued)

(56) References Cited

U.S. PATENT DOCUMENTS

2011/0312328 A1* 12/2011 Choi ..................... H04L 5/0091
455/450
2013/0294318 A1   11/2013 Amerga et al.
(Continued)

OTHER PUBLICATIONS

HTC: "Enhanced HARQ for NR", 3GPP Draft, 3GPP TSG RAN WG1 Meeting #88, R1-1702372, Enhanced HARQ for NR, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 13-Feb. 17, 2017, Feb. 12, 2017 (Feb. 12, 2017), XP051209526, 4 pages, Retrieved from the Internet: URL: http://www.3gpp.org/ftp/Meetings_3GPP_SYNC/RAN1/Docs/. [retrieved on Feb. 12, 2017] p. 3.
(Continued)

*Primary Examiner* — Wei Zhao
(74) *Attorney, Agent, or Firm* — Shumaker & Sieffert, P. A.

(57) ABSTRACT

Aspects are provided in which a UE and a base station are configured to manage a multi-configuration HARQ message. The base station may generate a control signal including an HARQ configuration and transmit the control signal to the UE. The HARQ configuration may include a timing information and/or a transmission method. The HARQ configuration may include a first configuration for ACK and a second configuration for NACK. The first configuration may be different from the second configuration. The UE may apply the corresponding HARQ configuration to an ACK or NACK message in response to the control signal from the base station. The base station may also transmit the HARQ configuration prior to the control signal. Thus, the ACK message generated and transmitted based on the first configuration different from the second configuration may have improved reliability to increase the stability of the 5G network.

23 Claims, 8 Drawing Sheets

(51) Int. Cl.
*H04W 80/02* (2009.01)
*H04L 1/1867* (2023.01)

(58) Field of Classification Search
CPC .............. H04L 1/1861; H04L 1/1812; H04L 2001/125; H04L 41/0896; H04L 41/0803
See application file for complete search history.

(56) References Cited

U.S. PATENT DOCUMENTS

| | | | | |
|---|---|---|---|---|
| 2015/0146588 | A1* | 5/2015 | Park | H04L 5/0098 370/280 |
| 2020/0106566 | A1* | 4/2020 | Yeo | H04W 28/04 |
| 2021/0135946 | A1* | 5/2021 | Babaei | H04L 1/1812 |

OTHER PUBLICATIONS

International Search Report and Written Opinion—PCT/US2021/029171—ISA/EPO—dated Jul. 16, 2021.

Mediatek Inc: "Discussion on V2X Physical Layer Procedure", 3GPP Draft, 3GPP TSG RAN WG1 #96bis, R1-1904497, V2X_Physical_Layer_Procedure, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8-Apr. 12, 2019, Apr. 3, 2019 (Apr. 3, 2019), 7 Pages, XP051707237.
Item 3 Continued: Retrieved from the Internet: URL: http://www.3gpp.org/ftp/tsg%5Fran/WG1%5FRL1/TSGR1%5F96b/Docs/R1%2D1904497%2Ezip. [Retrieved on Apr. 3, 2019], section 2.1.Item 3 Continued.
Sony: "HARQ-ACK Enhancement to Reduce Retransmission Time", 3GPP Draft, 3GPP TSG RAN WG1 #1 02-e, R1-2005569, 3rd Generation Partnership Project (3GPP), Mobile Competence Centre, 650, Route Des Lucioles, F-06921 Sophia-Antipolis Cedex, France, vol. RAN WG1. No. e-Meeting, Aug. 17-Aug. 28, 2020, Aug. 7, 2020 (Aug. 7, 2020), XP051917549, 4 Pages.
Item 5 Continued: Retrieved from the Internet: URL: https://ftp.3gpp.org/tsg_ran/WG1_RL1/TSGR1_102-e/Docs/R1-2005569.zip. R1-2005569—ReT-17 eURLLC—HARQ-ACK Enhancements v01.docx [retrieved on Aug. 7, 2020] the whole document.

* cited by examiner

METHOD AND APPARATUS WITH MULTI-CONFIGURATION HARQ MESSAGE

CROSS-REFERENCE TO RELATED APPLICATIONS

This application claims the benefit of U.S. Provisional Application Ser. No. 63/036,937, entitled "Method And Apparatus With Multi-Configuration HARQ Message" and filed on Jun. 9, 2020, the disclosure of which is expressly incorporated by reference herein in its entirety.

BACKGROUND

Technical Field

The present disclosure relates generally to communication systems, and more particularly, to a wireless communication network with multi-configuration hybrid automatic repeat request (HARQ) messages.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) and/or a base station. The base station may generate a control signal including an HARQ configuration and transmit the control signal to the UE. The HARQ configuration may include a timing information and/or a transmission method. The HARQ configuration may include a first configuration for an acknowledgement (ACK) message and a second configuration for a negative-acknowledgement (NACK) message. The UE may apply the corresponding HARQ configuration to the ACK or the NACK messages in response to the control signal to the base station. The base station may also transmit the HARQ configuration prior to the control signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
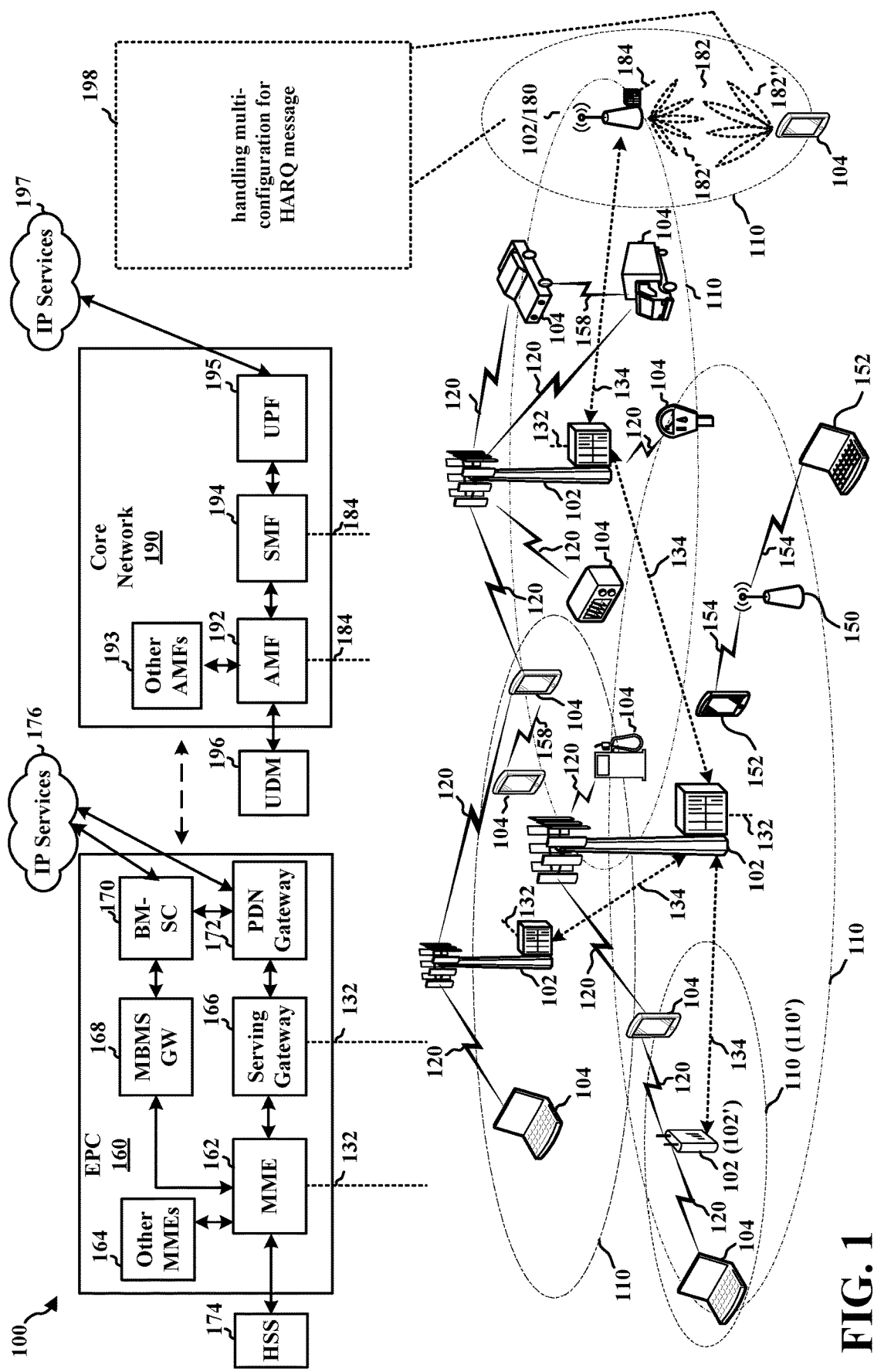
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 102/180 may be configured to manage a multi-configuration HARQ message (198). Although the following description may be focused on 5G NR, the concepts described herein may be applicable to other similar areas, such as LTE, LTE-A, CDMA, GSM, and other wireless technologies.

Figure 2:
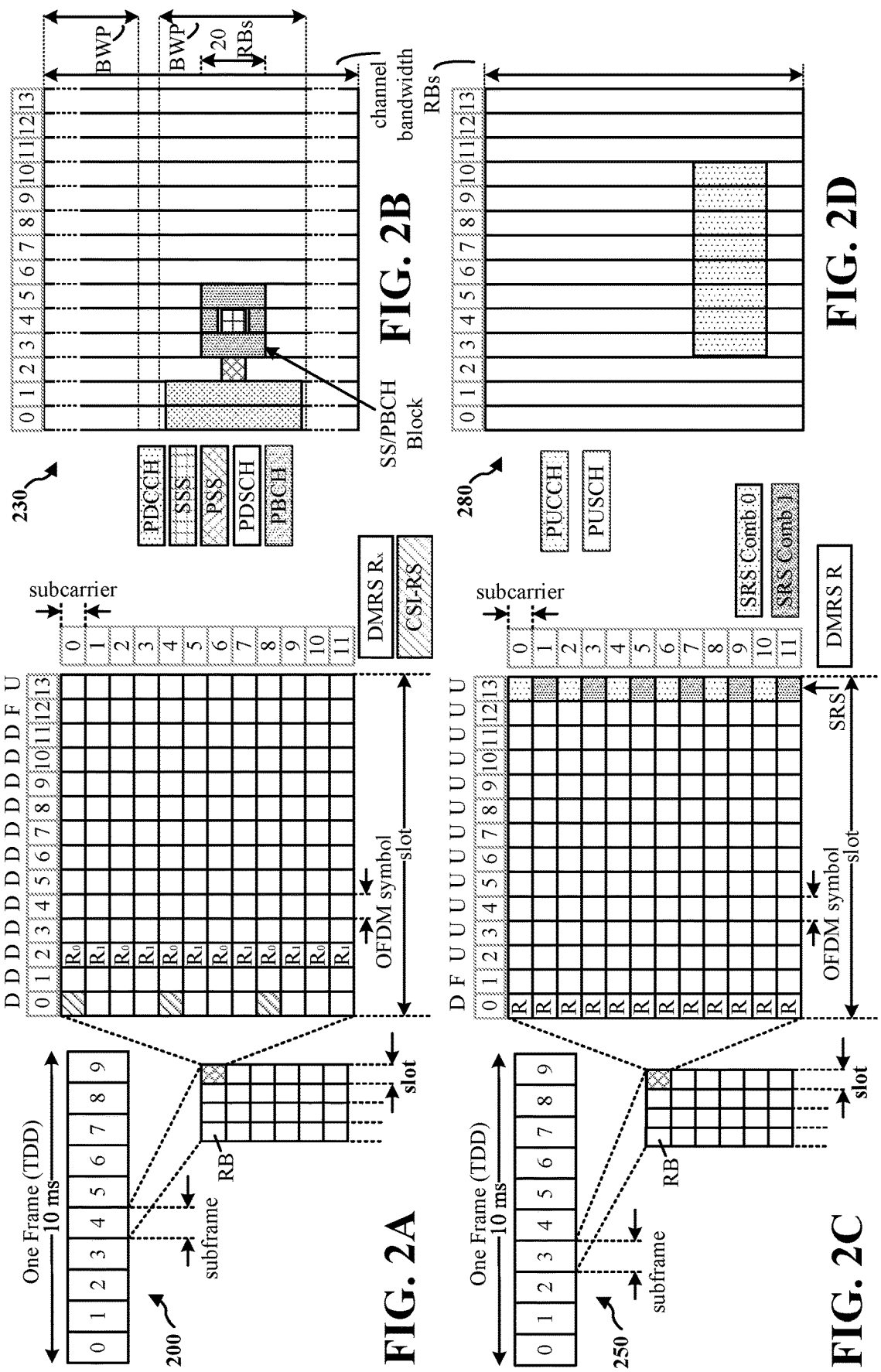
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD)

in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The sub-carrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
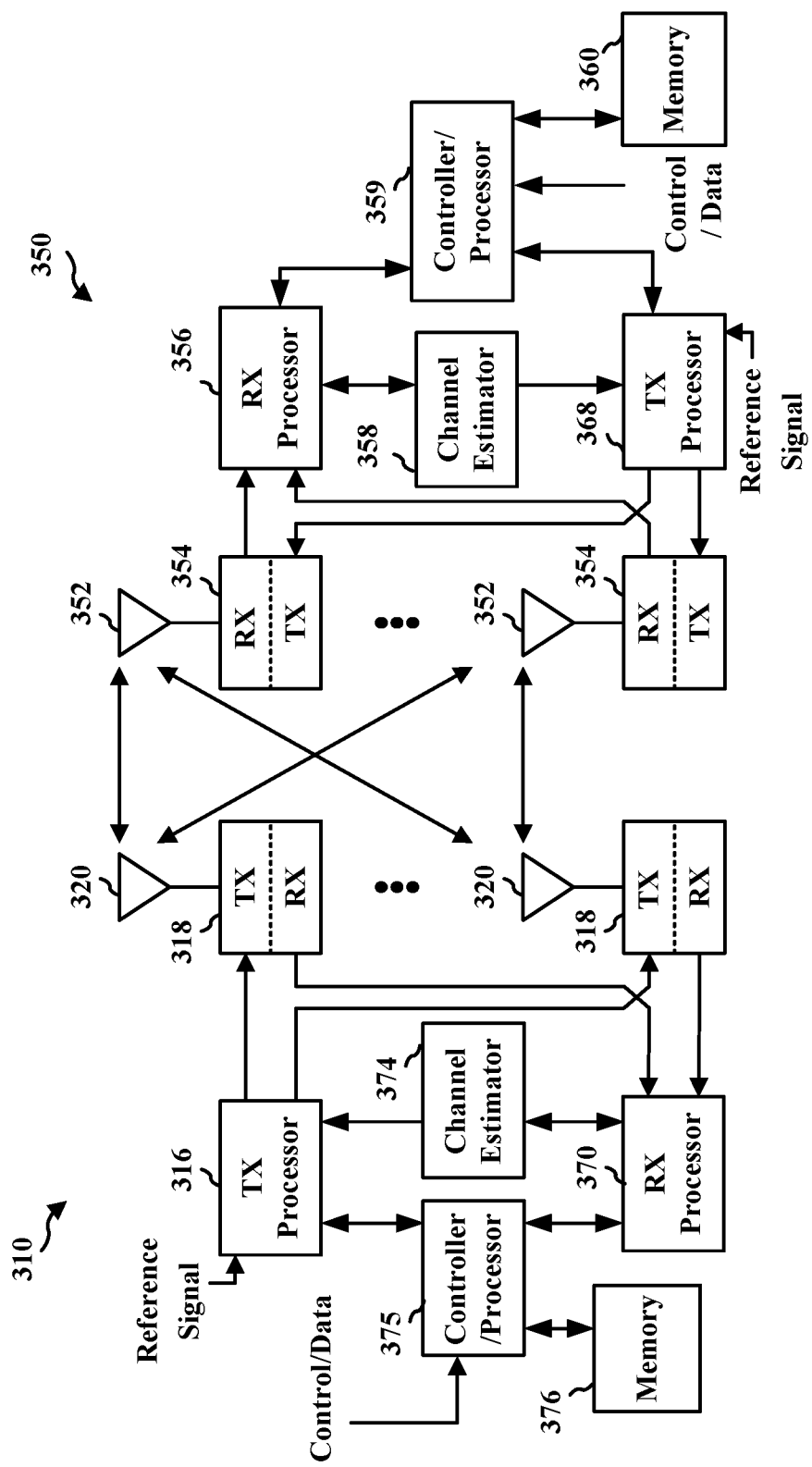
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

During the HARQ process, the receiver may receive a signal from the transmitter and send a HARQ message (or response) to the transmitter based on the signal received from the transmitter. The HARQ process may be associated with the signal transmission between the UE (e.g., the UE 104) and the base station (e.g., the base station 102/180). Therefore, the UE and the base station may be the receiver and the transmitter, respectively, and vice versa, based on the direction of the signal transmission.

The HARQ message may include an ACK message or an NACK message. The receiver may transmit the ACK message based on determining that the signal packet transmitted from the transmitter was successfully received. The receiver may transmit the NACK message based on determining that the signal packet transmitted from the transmitter was not successfully received. In some aspects, the ACK message may also indicate that the content of the signal packet transmitted from the transmitter was successfully received by the receiver. In other words, for a particular signal transmission, the receiver may transmit the ACK message to the transmitter to confirm the reception of the signal packet and the content of the signal from the transmitter. Here, the confirmation of reception of the content of the signal refers to successful parsing of the signal from the recovered signal packets transmitted from the transmitter. That is, in some cases the receiver may need to confirm in the ACK message that the content of the signal from the transmitter was successfully parsed from the signal packet, as well as the successful reception of the signal packet. In such cases, the receiver may need to spend more time to respond since confirming the successful reception of the content of the signal as well as confirming the successful reception of the signal may take more time. Furthermore, the ACK message may need to be more reliable than the NACK message to increase the stability of the 5G network. Accordingly, the timeline of the HARQ process may need to be configured differently for a signal transmission in which the ACK message indicates the successful reception of the signal packet and the successful reception of the content of the signal by the receiver.

For example, the base station may transmit a control signal to the UE with an instruction to switch a beamformed signal from a first beam to a second beam. As proffered, in a 5G network using a mmW frequency band, the transmission may be beamformed to mitigate the high path loss due to the high frequency and the short range of the mmW transmission. The base station and the UE may perform beam training to determine the best receive and transmit directions for each of the base station and the UE. The beamformed signal in the best received direction and/or the best transmitted direction may be referred to as the best beam, and the best beam may change over the time for various reasons, including the position of the UE, the CQI, etc. The base station may provide a set of possible beams in transmission configuration indicator (TCI) states via RRC or the DCI, and the base station may select one of the beams via an MAC control element (CE) (MAC-CE) or the DCI.

When the base station determines to change from the current beam to another beam, the base station may send a beam switch signal to the UE via the MAC-CE or a DCI, instructing the UE to change from the current beam to the another beam. The MAC-CE or the DCI instructing the UE to change beams may be transmitted using the current beam.

To verify that the network connection between the base station and the UE is maintained after the base station sends the beam switch signal to the UE, the base station may need to ensure that the UE has successfully received the beam change instruction before changing the beam configuration. In one example, to ensure that the UE has successfully received the beam change instruction, the base station may wait for an ACK message from the UE before switching to the new beam. That is, the base station may switch to the new beam after receiving the ACK message from the UE in response to the beam switch signal instructing the UE to change the beamformed signal from the current beam to the new beam.

The UE may confirm the successful reception of the beam switch signal packet and the content of the beam switch signal from the base station, and transmit the ACK message to the base station indicating the successful reception of the beam switch signal packet and the content of the beam switch signal from the base station. The UE may transmit the ACK message to the base station. The base station may receive the ACK message and then switch the beamformed signal and communication with the UE using the second beamformed signal.

However, the above procedure of switching beamformed signal after ACK may not work for the PUCCH beam switch if UL beam is blocked or does not have sufficient range/coverage (e.g. the ACK signal is not received by gNB). That is, if base station fails to receive the ACK message from the UE, the data transmission after the ACK message may not work between the base station and the UE since the base station may not change the beamformed signal to the second beamformed signal before receiving the ACK message from the UE, while the UE may switch to the second beamformed signal after transmitting ACK.

Accordingly, a coverage enhancement for an ACK response to the beam switch signal may be needed. For example, repetition of the ACK transmission may be used for the PDSCH transmission containing the confirmation of the beam switch signal MAC-CE, since the ACK message for the beam switching signal may need higher reliability compared to the NACK message. The examples of the disclosure are not limited there to, and in other examples, the NACK messages may need higher reliability compared to the ACK messages.

Therefore, different levels of reliability may be required for ACK message and the NACK message. Furthermore, the processing times for the ACK message and the NACK message may be different, depending on the application and specific meaning of the ACK/NACK messages.

Accordingly, the UE may be configured to follow separate timelines for ACK messages and NACK messages. For example, the different timelines for the ACK message and the NACK message may be configured by the base station and/or be predefined. Different timelines for the ACK message and the NACK message may be used depending on the associated procedure and the corresponding interpretations of the ACK message and the NACK message. For example, different timelines for ACK message and NACK message may be used when ACK message implies acknowledgement of both the reception of the signal packet and the content of the signal packet. The base station may dynamically indicate to the UE the activation of preconfigured separate timelines for the ACK message and the NACK message.

Furthermore, the UE may use different transmission methods for the ACK message and the NACK message when different timelines are applied to the ACK/NACK messages. That is, for the ACK message that implies the acknowledgement of the content of the control signal via the DCI and/or the MAC-CE, the UE may apply a timeline different from the timeline for the NACK message. The UE may also use a different repetition configuration and/or different transmission configuration for the ACK message compared to the NACK message.

Figure 4:
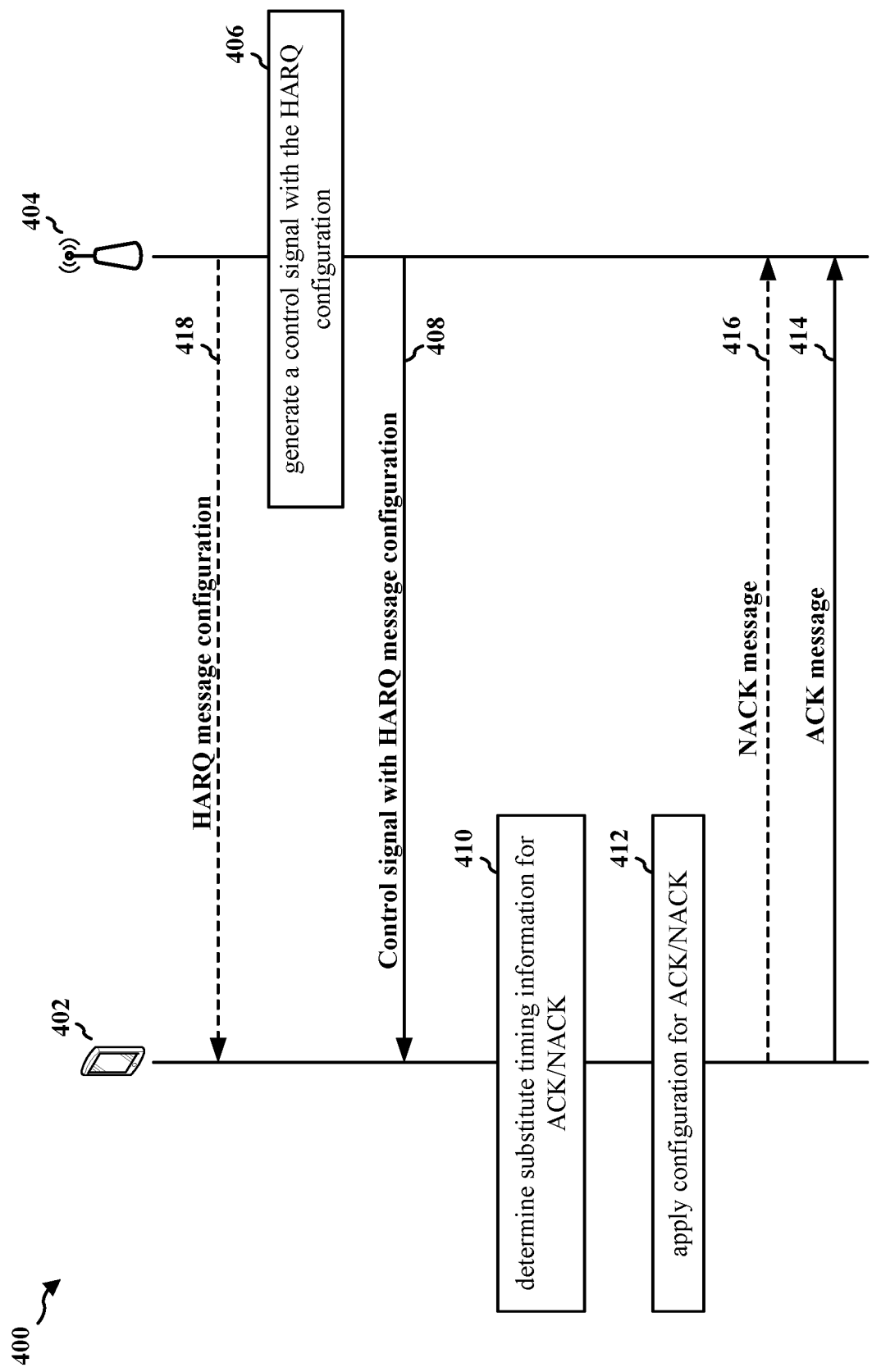
FIG. 4 is a call flow diagram of the wireless communication.

FIG. 4 is a call flow diagram 400 of the wireless communication between a UE 402 and a base station 404. At 406, the base station 404 may generate a control signal for transmission to the UE 402. The base station 404 may associate a HARQ configuration with the control signal. For example, the base station 404 may determine to instruct the UE 402 to apply different timelines for the ACK/NACK messages in the HARQ configuration. Particularly, the base station 404 may determine to instruct the UE 402 to apply a first timeline for the ACK message and a second timeline for the NACK message based on the associated procedure and the corresponding interpretation of the ACK message. For example, the base station 404 may determine to instruct the UE 402 to use different timelines for the ACK/NACK messages in response to determining that the base station 404 may proceed with the associated procedure upon receiving the ACK message.

At 408, the base station 404 may transmit the control signal with the HARQ message configuration to the UE 402 to instruct the UE 402 to use the different timelines for the ACK/NACK messages.

At 418, the base station 404 may transmit the HARQ message configuration semi-statically. That is, the base station 404 may transmit the HARQ message configuration to the UE 402 via an RRC message to define the different timelines for the ACK/NACK messages. Then, the base station 404 may transmit the control signal 408 to the UE 402 to instruct the UE 402 to select the different timelines for the ACK/NACK messages as semi-statically defined at 418.

Furthermore, the different timelines for the ACK/NACK messages may be predefined between the base station 404 and the UE 402. In such case, the base station 404 may transmit the control signal 408 to the UE 402 to instruct the UE 402 to select the different timelines for the ACK/NACK messages as predefined between the base station 404 and the UE 402.

At 410, the UE 402 may determine a substitute timing information for the ACK/NACK messages, based on the different timelines for the ACK/NACK messages. In certain aspects, the substitute timing information may be different from a default timing information for the ACK/NACK messages. That is, the UE 402 may receive the HARQ message configuration 408 from the base station 404 and determine that the substitute timing information is different from the default timing information for the ACK/NACK messages.

At 412, the UE 402 may apply the HARQ message configuration for the ACK/NACK messages. That is, the UE 402 may apply a first configuration including a first timeline for the ACK message and a second configuration including a second timeline for the NACK messages based on the substitute timing information determined for the ACK/NACK messages. The first configuration may be different from the second configuration, and the first timeline may be different from the second timeline. The first and second configurations may also include a first transmission configuration and a second transmission configuration different from the first transmission configuration for the ACK/NACK messages. The UE 402 may use the first transmission configuration and the second configuration for transmitting the ACK/NACK messages, respectively, to the base station 404. For example, the UE 402 may have a different repetition for transmitting the ACK/NACK messages or a different channel configuration for transmitting the ACK/NACK messages.

At 416, the UE 402 may transmit the NACK message to the base station 404 using the second configuration. That is, the UE 402 may use the second configuration to transmit the NACK message to the base station 404 in response to determining that the signal packet and/or the content of the signal was not successfully retrieved.

At 414, the UE 402 may transmit the ACK message to the base station 404 in response to successfully receiving the signal packet and the content of the signal using the first configuration. That is, the UE 402 may use the first configuration when transmitting the ACK message to the base station 404 in response to successfully receiving the signal packet and the content of the signal, using the first timeline and the first transmission configuration. The first configuration may be different from the second configuration. Accordingly, the first timeline may be different from the second timeline and the first transmission configuration may be different from the second transmission configuration.

Figure 5:
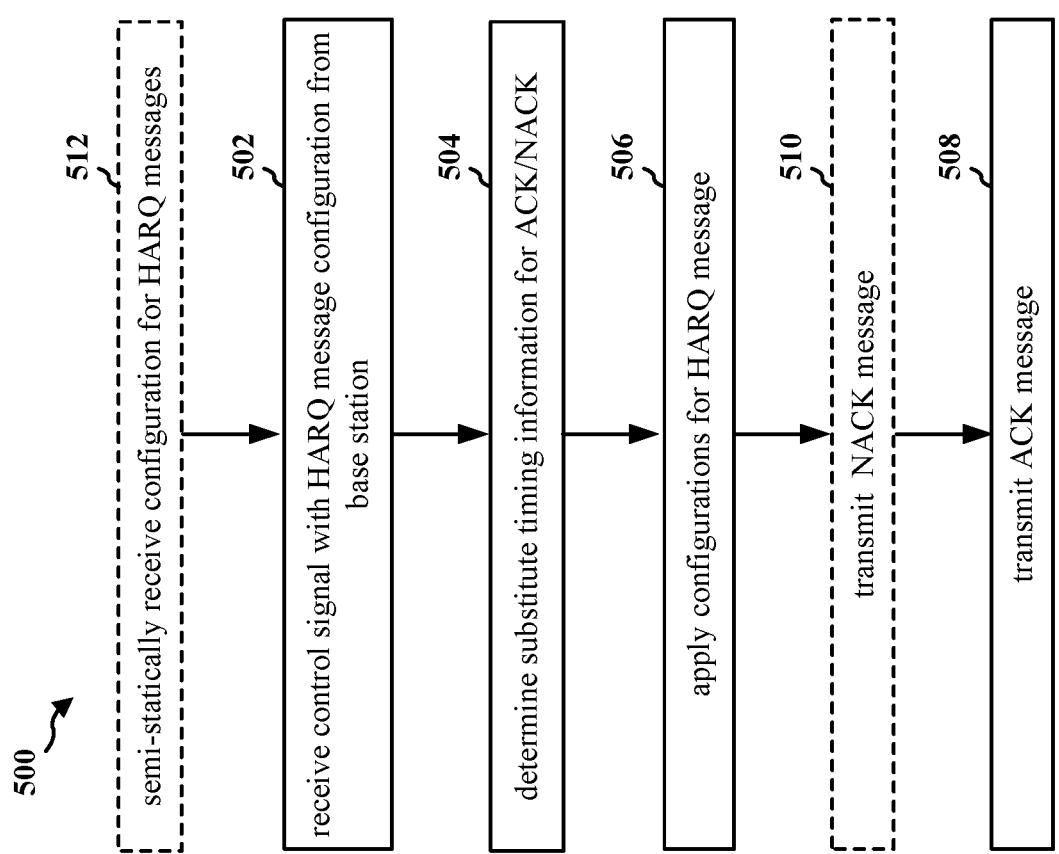
FIG. 5 is a flow diagram of a method of wireless communication.

FIG. 5 is a flowchart 500 of a method of wireless communication. The method may be performed by a UE (e.g., the UE 104/402; the apparatus 702). At 502, the UE may receive the control signal and the HARQ message configuration (408) from a base station (e.g., the base station 404) for transmitting the HARQ message in response to the control signal. For example, 502 may be performed by an HARQ message configuration component 742 of FIG. 7.

At 512, the UE may receive the HARQ message configuration semi-statically (418). That is, the UE may receive the HARQ message configuration from the base station via the RRC message, which defines different timelines for the ACK/NACK messages. For example, 512 may be performed by the HARQ message configuration component 742 of FIG. 7.

At 504, the UE may determine a substitute timing information for the ACK/NACK message (410) based on the different timelines for the ACK/NACK messages. That is, the UE may receive the HARQ message configuration (408) from the base station and determine the substitute timing information different from the default timing information for the ACK/NACK messages, to apply the different timeline for the ACK/NACK messages. For example, 504 may be performed by the HARQ message configuration component 742 of FIG. 7.

At 506, the UE may apply the HARQ message configurations (412). That is, the UE may apply a first configuration including a first timeline and/or a first transmission configuration for the ACK message and a second configuration including a second timeline and/or a second transmission configuration for the NACK messages based on the substitute timing information determined for the ACK/NACK messages. For example, 506 may be performed by the HARQ message configuration component 742 of FIG. 7.

At 508, the UE may transmit ACK message (414). That is, the UE may transmit the ACK message to the base station using the first configuration including the first timeline and/or the first transmission configuration. For example, 508 may be performed by an HARQ component 740 of FIG. 7.

Finally, at 510, the UE may transmit the NACK message (416) That is, the UE may transmit the NACK message to the base station using the second configuration. For example, 510 may be performed by the HARQ component 740 of FIG. 7.

Figure 6:
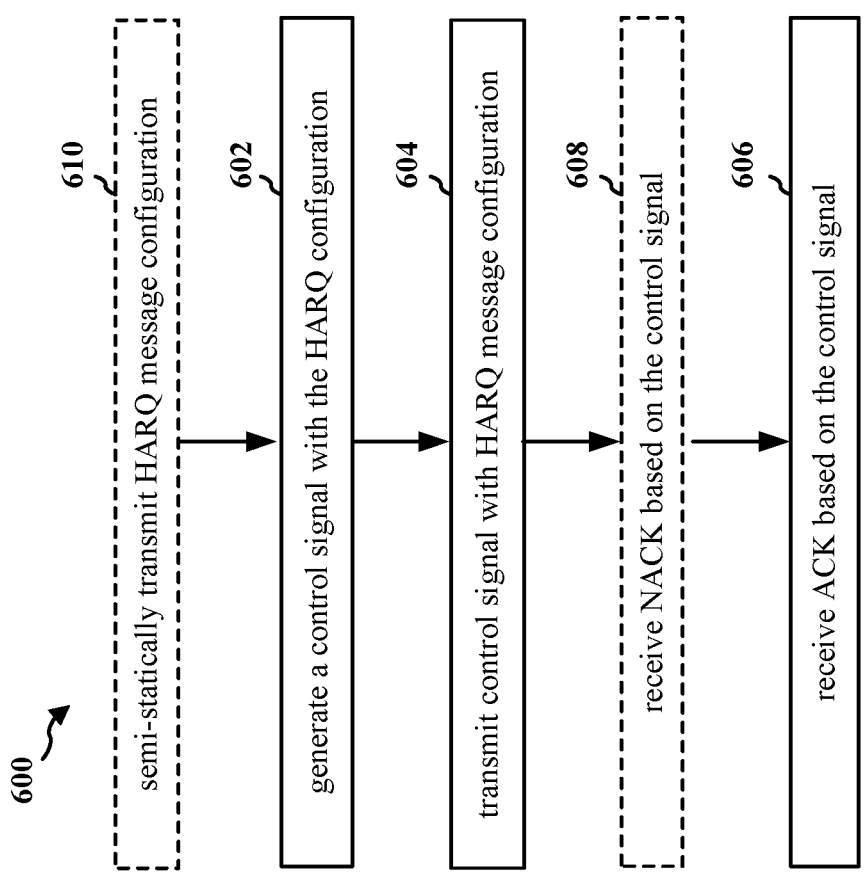
FIG. 6 is a flow diagram of a method of wireless communication.

FIG. 6 is a flowchart 600 of a method of wireless communication. The method may be performed by a base station (e.g., the base station 102/404/180; the apparatus 802). At 602, the base station may generate a control signal with the HARQ configuration (406). That is, the base station 404 may determine to instruct the UE to apply the different timelines for the ACK/NACK messages in the HARQ configuration. For example, 602 may be performed by a HARQ message configuration component 842 of FIG. 8.

At 604, the base station may transmit the control signal with the HARQ message configuration to the UE (408). That is, the base station may transmit the control signal with the HARQ message configuration to the UE to instruct the UE to apply the different timeline to the ACK/NACK messages. For example, 604 may be performed by the HARQ message configuration component 842 of FIG. 8.

At 610, the base station may transmit the HARQ message configuration semi-statically. That is, the base station may transmit the HARQ message configuration to the UE via the RRC message to define different timelines for the ACK/NACK messages. For example, 610 may be performed by the HARQ message configuration component 842 of FIG. 8.

At 606, the base station may receive the ACK message based on the control signal from the UE (414). That is, the base station may receive the ACK message from the UE following the first configuration including a first timeline and/or a first transmission configuration. For example, 606 may be performed by a HARQ component 840 of FIG. 8.

Finally, at 608, the base station may receive the NACK message based on the control signal from the UE (416). That is, the base station may receive the NACK message to the base station using the second configuration. For example, 608 may be performed by the HARQ component 840 of FIG. 8.

Figure 7:
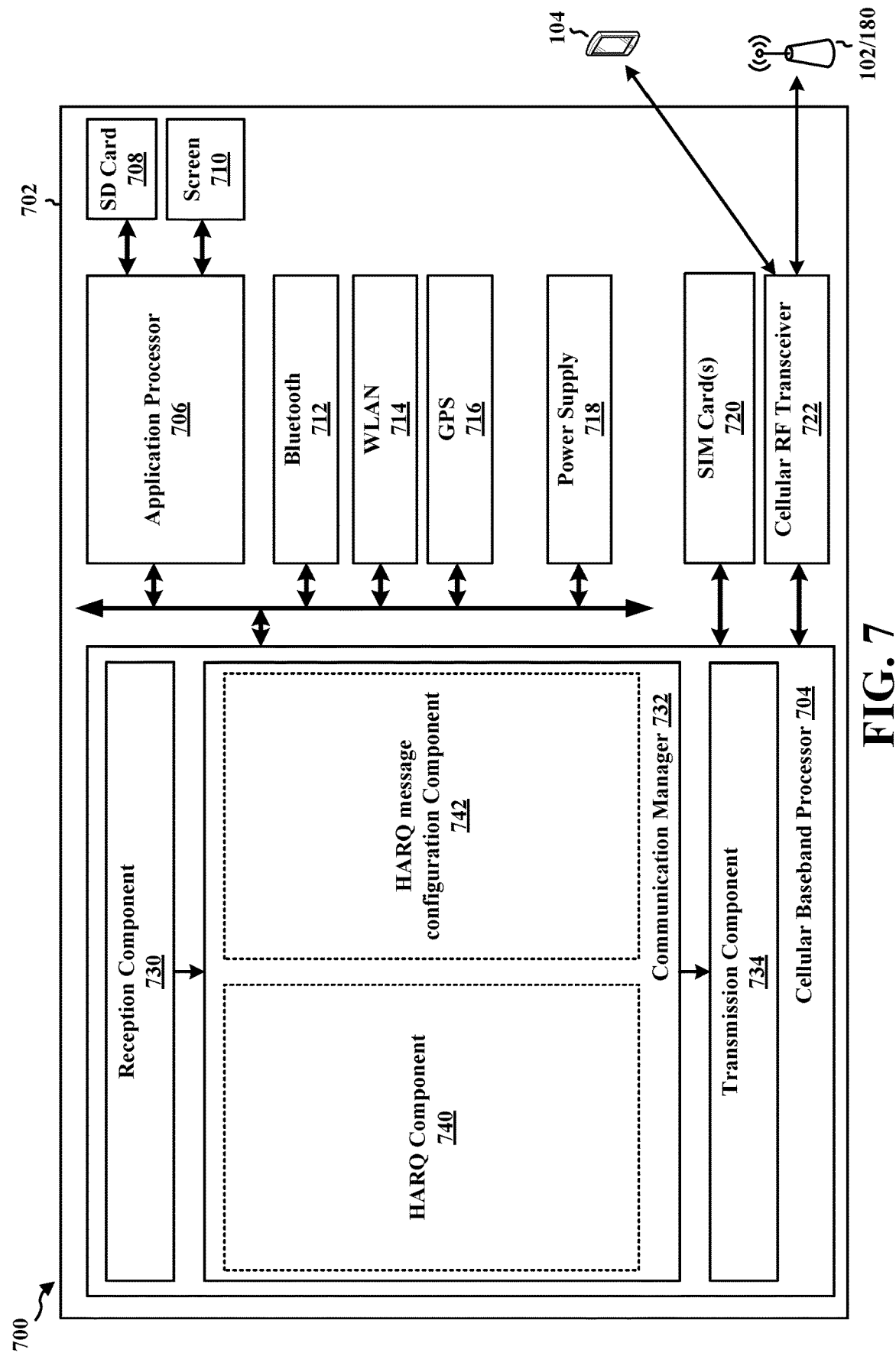
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the aforediscussed additional modules of the apparatus 702.

The communication manager 732 includes an HARQ component 740 that is configured to transmit the ACK/NACK messages to the base station using the first/second configurations, e.g., as described in connection with 508 and 510. The communication manager 732 further includes an HARQ message configuration component 742 that is configured to receive the control signal with the HARQ message configuration from the base station (dynamically or semi-statically), determine the substitute timing information for the ACK/NACK messages, and apply the HARQ message configurations, e.g., as described in connection with 502, 504, 506, and 512. The components 740 and 742 may be configured to communicate with each other.

The apparatus may include additional components that perform each of the blocks of the algorithm in the aforementioned flowcharts of FIGS. 4 and 5. As such, each block in the aforementioned flowcharts of FIGS. 4 and 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for receiving a control signal from a base station, means for applying a configuration for a HARQ message including a first configuration for transmitting an ACK message and a second configuration for transmitting an NACK message, the first configuration being different from the second configuration based on the control signal received from the base station, and means for transmitting the HARQ message based on a timing information of the configuration based on the control signal, means for determining substitute timing information defining a timeline that the UE transmits the HARQ message from the control signal, the substitute timing information being different from default timing information for the HARQ message, and means for receiving the configuration for the HARQ message prior to the control signal including an instruction to the UE to activate the configuration for the HARQ message. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
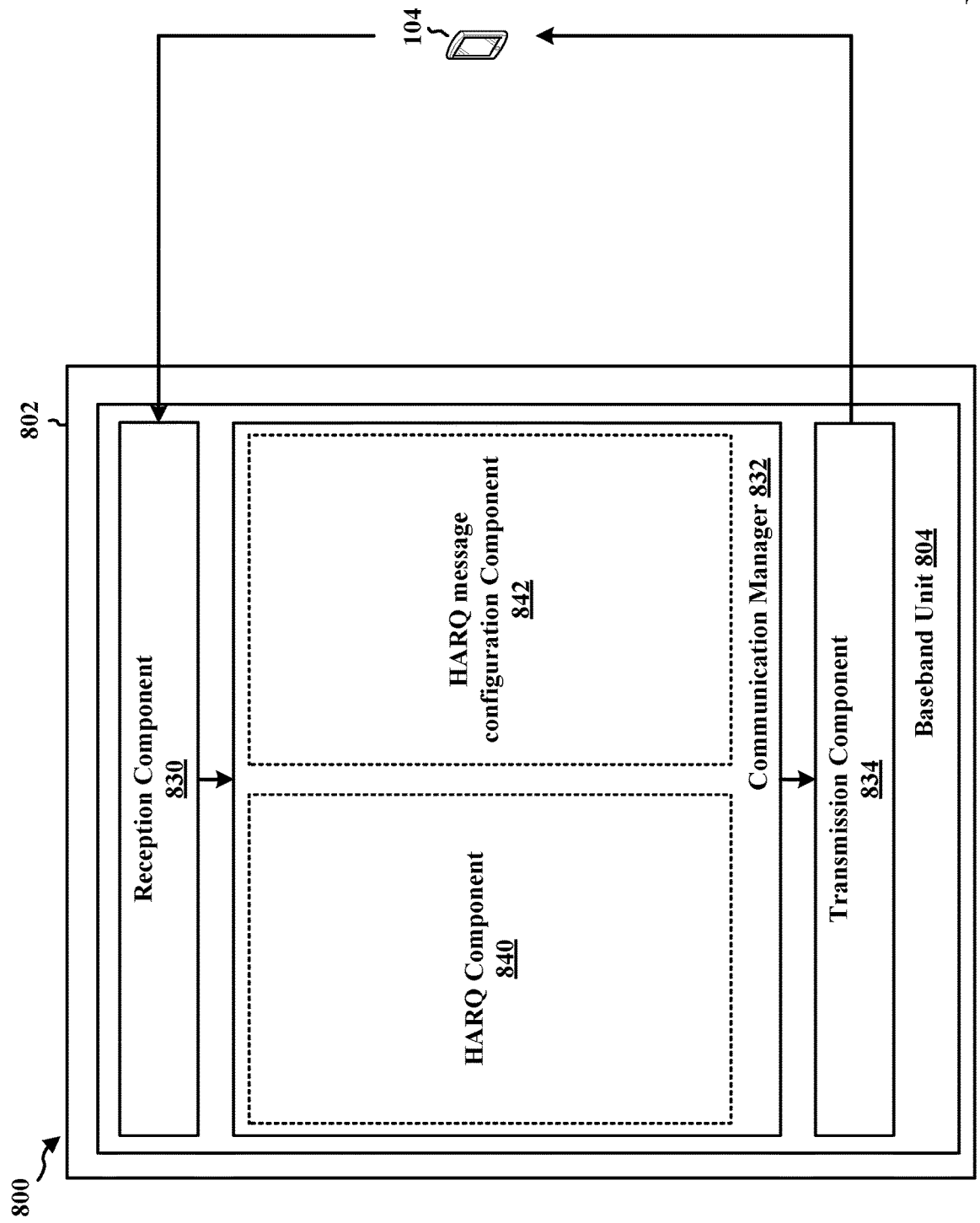
FIG. 8 is a diagram illustrating an example of a hardware implementation for an example apparatus.

FIG. 8 is a diagram 800 illustrating an example of a hardware implementation for an apparatus 802. The apparatus 802 is a BS and includes a baseband unit 804. The baseband unit 804 may communicate through a cellular RF transceiver with the UE 104. The baseband unit 804 may include a computer-readable medium/memory. The baseband unit 804 is responsible for general processing, including the execution of software stored on the computer-readable medium/memory. The software, when executed by the baseband unit 804, causes the baseband unit 804 to perform the various functions described supra. The computer-readable medium/memory may also be used for storing data that is manipulated by the baseband unit 804 when executing software. The baseband unit 804 further includes a reception component 830, a communication manager 832, and a transmission component 834. The communication manager 832 includes the one or more illustrated components. The components within the communication manager 832 may be stored in the computer-readable medium/memory and/or configured as hardware within the baseband unit 804. The baseband unit 804 may be a component of the BS 310 and may include the memory 376 and/or at least one of the TX processor 316, the RX processor 370, and the controller/processor 375.

The communication manager 832 includes an HARQ component 840 that is configured to receive the ACK/NACK messages based on the control signal from the UE, e.g., as described in connection with 606 and 608. The communication manager 832 further includes an HARQ message configuration component 842 that is configured to generate a control signal with the HARQ configuration, and transmit the control signal with the HARQ message configuration to the UE, dynamically or semi-statically, e.g., as described in connection with 602, 604, and 610. The components 840 and 842 may be configured to communicate with each other.

The apparatus may include additional components that perform each of the blocks of the algorithm in the aforementioned flowcharts of FIGS. 4 and 6. As such, each block in the aforementioned flowcharts of FIGS. 4 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the baseband unit 804, includes means for generating a control signal including an instruction to a UE to apply a configuration for an HARQ message including a first configuration for transmitting an ACK message and a second configuration for transmitting an NACK message, the first configuration being different from the second configuration, means for transmitting the control signal to the UE, and means for receiving the HARQ message from the UE based on a timing information of the configuration based on the control signal transmitted to the UE. The aforementioned means may be one or more of the aforementioned components of the apparatus 802 configured to perform the functions recited by the aforementioned means. As described supra, the apparatus 802 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Referring again to FIGS. 4, 5, 6, 7, and 8, a UE and/or a base station may be configured to manage a multi-configuration HARQ message. The base station may generate a control signal including an HARQ configuration and transmit the control signal to the UE. The HARQ configuration may include a timing information and/or a transmission method. The HARQ configuration may include a first configuration for an ACK message and a second configuration for an NACK message. The UE may apply the corresponding HARQ configuration to ACK and/or NACK messages in response to the control signal to the base station. The base station may also transmit the HARQ configuration prior to the control signal. The first configuration may be different from the second configuration. The ACK message generated and transmitted based on the first configuration different from the second configuration may have improved reliability to increase the stability of the 5G network.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication of a user equipment (UE), comprising: receiving a control signal from a base station; applying a configuration for a hybrid automatic repeat request (HARQ) message including a first configuration for transmitting an acknowledgement (ACK) message and a second configuration for transmitting a negative-acknowledgement (NACK) message, the first configuration being different from the second configuration based on the control signal received from the base station; and transmitting the HARQ message based on timing information of the configuration based on the control signal.

Example 2 is the method of Example 1, further comprising: determining substitute timing information for the HARQ message from the control signal, wherein the substitute timing information is different from default timing information for the HARQ message, and wherein the timing information defines a timeline that the UE transmits the HARQ message.

Example 3 is the method of any of Examples 1 and 2, wherein the first configuration includes a first timeline for the ACK and the second configuration includes a second timeline for the NACK, and wherein the UE transmits an ACK message based on the first timeline or transmitting the NACK message based on the second timeline.

Example 4 is the method of any of Examples 1-3, further comprising: receiving the configuration for the HARQ message prior to the control signal, wherein the control signal includes an instruction to the UE to activate the configuration for the HARQ message.

Example 5 is the method of any of Examples 1-4, wherein the configuration is received in a radio resource control (RRC) message.

Example 6 is the method of any of Examples 1-5, wherein the control signal including the instruction to apply the configuration is received in at least one of a downlink control information (DCI) or a medium access control-control element (MAC-CE).

Example 7 is the method of any of Examples 1-6, wherein the first configuration includes a first transmission method for transmitting the ACK message and the second configuration includes a second transmission method for transmitting the NACK message, the first transmission method being different from the second transmission method.

Example 8 is an apparatus for wireless communication of a user equipment (UE), comprising: a memory; and at least one processor coupled to the memory and configured to: receive a control signal from a base station; apply a configuration for a hybrid automatic repeat request (HARQ) message including a first configuration for transmitting an acknowledgement (ACK) message and a second configuration for transmitting a negative-acknowledgement (NACK) message, the first configuration being different from the second configuration based on the control signal received from the base station; and transmit the HARQ message based on timing information of the configuration based on the control signal.

Example 9 is the apparatus of Example 8, wherein the at least one processor is further configured to: determine substitute timing information for the HARQ message from the control signal, wherein the substitute timing information is different from default timing information for the HARQ message, and wherein the timing information defines a timeline that the UE transmits the HARQ message.

Example 10 is the apparatus of any of Examples 8 and 9, wherein the first configuration includes a first timeline for the ACK and the second configuration includes a second timeline for the NACK, and wherein the UE transmits an ACK message based on the first timeline or transmitting the NACK message based on the second timeline.

Example 11 is the apparatus of any of Examples 8-10, wherein the at least one processor is further configured to: receive the configuration for the HARQ message prior to the control signal, wherein the control signal includes an instruction to the UE to activate the configuration for the HARQ message.

Example 12 is the apparatus of any of Examples 8-11, wherein the configuration is received in a radio resource control (RRC) message.

Example 13 is the apparatus of any of Examples 8-12, wherein the control signal including the instruction to apply the configuration is received in at least one of a downlink control information (DCI) or a medium access control-control element (MAC-CE).

Example 14 is the apparatus of any of Examples 8-13, wherein the first configuration includes a first transmission method for transmitting the ACK message and the second configuration includes a second transmission method for transmitting the NACK message, the first transmission method being different from the second transmission method.

Example 15 is a non-transitory computer-readable medium storing computer executable code, the code when executed by a processor of a user equipment (UE) cause the processor to: receive a control signal from a base station; apply a configuration for a hybrid automatic repeat request (HARQ) message including a first configuration for transmitting an acknowledgement (ACK) message and a second configuration for transmitting a negative-acknowledgement (NACK) message, the first configuration being different from the second configuration based on the control signal received from the base station; and transmit the HARQ message based on timing information of the configuration based on the control signal.

Example 16 is the computer-readable medium of Example 15, wherein the code further causes the processor to: determine substitute timing information for the HARQ message from the control signal, wherein the substitute timing information is different from default timing information for the HARQ message, and wherein the timing information defines a timeline that the UE transmits the HARQ message.

Example 17 is the computer-readable medium of any of Examples 15 and 16, wherein the first configuration includes a first timeline for the ACK and the second configuration includes a second timeline for the NACK, and wherein the UE transmits an ACK message based on the first timeline or transmitting the NACK message based on the second timeline.

Example 18 the computer-readable medium of any of Examples 15-17, wherein the code further causes the processor to: receive the configuration for the HARQ message prior to the control signal, wherein the control signal includes an instruction to the UE to activate the configuration for the HARQ message.

Example 19 is the computer-readable medium of any of Examples 15-18, wherein the configuration is received in a radio resource control (RRC) message.

Example 20 is the computer-readable medium of any of Examples 15-19, wherein the control signal including the instruction to apply the configuration is received in at least one of a downlink control information (DCI) or a medium access control-control element (MAC-CE).

Example 21 is the computer-readable medium of any of Examples 15-20, wherein the first configuration includes a first transmission method for transmitting the ACK message and the second configuration includes a second transmission method for transmitting the NACK message, the first transmission method being different from the second transmission method.

Example 22 is an apparatus for wireless communication at a base station, comprising: a memory; and at least one processor coupled to the memory and configured to: generate a control signal including an instruction to a user equipment (UE) to apply a configuration for a hybrid automatic repeat request (HARQ) message including a first configuration for transmitting an acknowledgement (ACK) message and a second configuration for transmitting a negative-acknowledgement (NACK) message, the first configuration being different from the second configuration; transmit the control signal to the UE; and receive the HARQ message from the UE based on a timing information of the configuration based on the control signal transmitted to the UE.

Example 23 is the apparatus of Example 22, wherein the control signal includes an instruction to activate a substitute timing information for the HARQ message, wherein the substitute timing information is different from default timing information for the HARQ message.

Example 24 is the apparatus of any of Examples 22 and 23, wherein the control signal instructing the UE to apply the configuration is transmitted via at least one of a downlink control information (DCI) or a medium access control-control element (MAC-CE).

Example 25 is the apparatus of any of Examples 22-24, wherein the at least one processor is further configured to transmit, prior to transmitting the control signal, a configuration to the UE via a radio resource control (RRC) message to define different timelines for use by the UE in transmitting the HARQ message to the base station.

Example 26 is the apparatus of any of Examples 22-25, wherein the control signal further includes an instruction to the UE to confirm both successful receipt of a transmission and successful receipt of content of information in the transmission.

What is claimed is:

1. A method of wireless communication of a user equipment (UE), comprising:
receiving a control signal from a base station, the control signal being associated with a configuration for a hybrid automatic repeat request (HARQ) message, the configuration including a first configuration for transmitting an acknowledgement (ACK) message and a separate, second configuration for transmitting a negative-acknowledgement (NACK) message, the first configuration being different from the second configuration, the first configuration including a first timeline for transmitting the ACK message, the second configuration including a second timeline for transmitting the NACK message, and wherein the second timeline is different from the first timeline; and
transmitting the HARQ message based on the first timeline in the first configuration for the ACK message or based on the second timeline in the second configuration for the NACK message.

2. The method of claim 1, further comprising:
determining substitute timing information for the HARQ message from the control signal, wherein the substitute timing information includes the first timeline and the second timeline, and wherein the substitute timing information is different from default timing information for the HARQ message.

3. The method of claim 1, further comprising:
receiving the configuration for the HARQ message prior to the control signal, wherein the control signal includes an instruction to the UE to activate the configuration for the HARQ message.

4. The method of claim 3, wherein the configuration is received in a radio resource control (RRC) message.

5. The method of claim 4, wherein the control signal including the instruction to apply the configuration is received in at least one of a downlink control information (DCI) or a medium access control-control element (MAC-CE).

6. The method of claim 1, wherein the first configuration includes a first transmission method for transmitting the ACK message and the second configuration includes a second transmission method for transmitting the NACK message, the first transmission method being different from the second transmission method.

7. An apparatus for wireless communication of a user equipment (UE), comprising:
a memory; and
at least one processor coupled to the memory and configured to:
receive a control signal from a base station, the control signal being associated with a configuration for a hybrid automatic repeat request (HARQ) message, the configuration including a first configuration for transmitting an acknowledgement (ACK) message and a separate, second configuration for transmitting a negative-acknowledgement (NACK) message, the first configuration being different from the second configuration, the first configuration including a first timeline for transmitting the ACK message, the second configuration including a second timeline for transmitting the NACK message, and wherein the second timeline is different from the first timeline; and
transmit the HARQ message based on the first timeline in the first configuration for the ACK message or based on the second timeline in the second configuration for the NACK message.

8. The apparatus of claim 7, wherein the at least one processor is further configured to:
determine substitute timing information for the HARQ message from the control signal, wherein the substitute timing information includes the first timeline and the second timeline, and wherein the substitute timing information is different from default timing information for the HARQ message.

9. The apparatus of claim 7, wherein the at least one processor is further configured to:
receive the configuration for the HARQ message prior to the control signal, wherein the control signal includes an instruction to the UE to activate the configuration for the HARQ message.

10. The apparatus of claim 9, wherein the configuration is received in a radio resource control (RRC) message.

11. The apparatus of claim 10, wherein the control signal including the instruction to apply the configuration is received in at least one of a downlink control information (DCI) or a medium access control-control element (MAC-CE).

12. The apparatus of claim 7, wherein the first configuration includes a first transmission method for transmitting the ACK message and the second configuration includes a second transmission method for transmitting the NACK message, the first transmission method being different from the second transmission method.

13. A non-transitory computer-readable medium storing computer executable code, the code when executed by a processor of a user equipment (UE) cause the processor to:
receive a control signal from a base station, the control signal being associated with a configuration for a hybrid automatic repeat request (HARQ) message, the configuration including a first configuration for transmitting an acknowledgement (ACK) message and a separate, second configuration for transmitting a negative-acknowledgement (NACK) message, the first configuration being different from the second configuration, the first configuration including a first timeline for transmitting the ACK message, the second configuration including a second timeline for transmitting the NACK message, and wherein the second timeline is different from the first timeline; and
transmit the HARQ message based on the first timeline in the first configuration for the ACK message or based on the second timeline in the second configuration for the NACK message.

14. The non-transitory computer readable medium of claim 13, wherein the code further causes the processor to:
determine substitute timing information for the HARQ message from the control signal, wherein the substitute timing information includes the first timeline and the second timeline, and wherein the substitute timing information is different from default timing information for the HARQ message.

15. The non-transitory computer readable medium of claim 13, wherein the code further causes the processor to: receive the configuration for the HARQ message prior to the control signal, wherein the control signal includes an instruction to the UE to activate the configuration for the HARQ message.

16. The non-transitory computer readable medium of claim 15, wherein the configuration is received in a radio resource control (RRC) message.

17. The non-transitory computer readable medium of claim 16, wherein the control signal including the instruction to apply the configuration is received in at least one of a downlink control information (DCI) or a medium access control-control element (MAC-CE).

18. The non-transitory computer readable medium of claim 13, wherein the first configuration includes a first transmission method for transmitting the ACK message and the second configuration includes a second transmission method for transmitting the NACK message, the first transmission method being different from the second transmission method.

19. An apparatus for wireless communication of a base station, comprising:
a memory; and
at least one processor coupled to the memory and configured to:
transmit a control signal including an instruction to a user equipment (UE) to apply a configuration for a hybrid automatic repeat request (HARQ) message, the configuration including a first configuration for transmitting an acknowledgement (ACK) message and a separate, second configuration for transmitting a negative-acknowledgement (NACK) message, the first configuration being different from the second configuration, the first configuration including a first timeline for transmitting the ACK message, the second configuration including a second timeline for transmitting the NACK message, and wherein the second timeline is different from the first timeline; and
receive the HARQ message from the UE based on the first timeline in the first configuration for the ACK message or based on the second timeline in the second configuration for the NACK message.

20. The apparatus of claim 19, wherein the control signal includes an instruction to activate a substitute timing information for the HARQ message, wherein the substitute timing information includes the first timeline and the second timeline, and wherein the substitute timing information is different from default timing information for the HARQ message.

21. The apparatus of claim 19, wherein the control signal instructing the UE to apply the configuration is transmitted via at least one of a downlink control information (DCI) or a medium access control-control element (MAC-CE).

22. The apparatus of claim 19, wherein the at least one processor is further configured to transmit, prior to transmitting the control signal, the configuration to the UE via a radio resource control (RRC) message.

23. The apparatus of claim 19, wherein the control signal further includes an instruction to the UE to confirm both successful receipt of a transmission and successful receipt of content of information in the transmission.

* * * * *